United States Patent [19]
Iida et al.

[11] Patent Number: 4,916,735
[45] Date of Patent: Apr. 10, 1990

[54] POWER-SUPPLY TRANSFER APPARATUS FOR TELEPHONE

[75] Inventors: Masayuki Iida, Yawata; Shinichi Tsurufuji, Nara, both of Japan

[73] Assignee: Sanyo Electric Co., Ltd., Osaka, Japan

[21] Appl. No.: 106,484

[22] Filed: Oct. 6, 1987

[30] Foreign Application Priority Data

| Oct. 7, 1986 [JP] | Japan | 61-238504 |
| Oct. 7, 1986 [JP] | Japan | 61-238505 |
| Oct. 13, 1986 [JP] | Japan | 61-242554 |

[51] Int. Cl.$^4$ .............................................. H04M 19/08
[52] U.S. Cl. ...................................... 379/413; 379/387
[58] Field of Search ................. 379/52, 338, 387, 413, 379/399

[56] References Cited

U.S. PATENT DOCUMENTS

| 4,232,200 | 11/1980 | Hestad et al. | 379/413 X |
| 4,578,540 | 3/1986 | Borg et al. | 379/387 X |
| 4,585,904 | 4/1986 | Mincone et al. | 379/93 X |
| 4,670,628 | 6/1987 | Boratgis et al. | 379/212 X |

OTHER PUBLICATIONS

"Bridging the Worlds of the Deaf and Hearing", G. A. Abbink, Telephony, May 24, 1982, pp. 76–80.

Primary Examiner—Jin F. Ng
Assistant Examiner—Randall Vaas
Attorney, Agent, or Firm—Darby & Darby

[57] ABSTRACT

The invention is directed to a prower-supply transfer apparatus for a telephone wherein the power supply is fed from a telephone line by a power supply transferring circuit when the operation has been decided as a low speed operation by a speed deciding circuit, the power supply is fed from a separate power supply circuit by the power-supply transferring circuit when the operation has been decided as the high speed operation, so that the low-speed operation is performed through the speed control by the speed decision result not only when the processing may be performed even at the low speed operation in the common telephone or the like, but also when the high-speed processing is required in voice recognition or the like.

11 Claims, 6 Drawing Sheets

POWER-SUPPLY TRANSFER APPARATUS FOR TELEPHONE

BACKGROUND OF THE INVENTION

The present invention relates to a power supply transfer apparatus for a voice recognizing telephone provided with voice recognizing functions or high/many functions as a telephone.

Conventionally, many telephones which have applied the function of voice recognition into the operation of a dial or have had many functions are taken into consideration. In order to have a recognition ratio and a recognition speed high enough to be used in practical application, and the operation contents of many functions of the telephone, it is often that processing apparatuses such as highly efficient microcomputers capable of high-speed operation are required to be used. Recently, the IC of CMOS controlling the consumption current or the microcomputer may be used, but the consumption current is almost proportional to the operation speed. In order to perform the voice recognition processing necessary for high-speed operation, a considerable amount of consumption current is required. Thus, the telephone which has a voice recognition function or many functions and uses more consumption current requires the other power supply such as commercial power supply through the AC adapter, etc., because the power supply of the telephone line only is not sufficient. Accordingly, the high-speed operation is normally required, i.e., more consumption current is normally required as a telephone. Also, the power of the telephone cannot be fed at the AC service interruption, so that the telephone cannot be used.

Also, as the telephone which has a voice recognition function has more power consumption, the power supply thereto separate from the line power supply is required. But when the separate power supply has gone wrong, the on-hook for the telephone cannot be performed by the voice instructions. At this time, if a person can use his limbs, he may perform the on-hook manually. When a physically handicapped person who can not use his limbs has to perform the on-hook automatically after a certain time, because there is no on-hook means. Accordingly, as the on-hook is performed in the course of the talking, the user has to dial again after the power supply has been recovered, with this problem being bothersome.

SUMMARY OF THE INVENTION

Accordingly, an essential object of the present invention is to provide a power supply transfer apparatus for a telephone establishing the necessary operation speed through the speed control by a speed deciding circuit under controlling of the consumption current so as to provide lower consumption power as the entire telephone.

Another important object of the present invention is to receive the supply of the power from a separate power supply circuit such as commercial power supply through AC adapter or the like when the high/many function operations for voice recognition are performed, but to receive the power supply of the telephone line, when this separate power supply has stopped, so as to make the fundamental telephone function work.

Still another object of the present invention is to solve a problem that the on-hook cannot be performed by the voice instructions when the above problem, i.e., the power supply separate from the power supply of the telephone line has gone wrong.

In accomplishing these and other objects, according to one preferred embodiment of the present invention, the low-speed operation is performed through the speed control by the speed decision result when the processing may be performed even at the low speed operation in the common telephone or the like, the high-speed operation is performed through the speed control by the speed decision result when the high-speed processing is required in voice recognition or the like.

Accordingly, in the present invention, the operation at the actual time may be performed by the higher-speed of the operation when the high-speed processing in voice recognition or the like is required. On the other hand, the processing operation may be performed even at the low speed operation is the telephone function is fundamental, so that the consumption current may be made lower in this case. Generally, as the using time of the fundamental telephone function is more than that of the voice recognition function or many functions requiring the high-speed operation, the consumption current of the entire telephone may be considerable.

Also, in another embodiment of the present invention, when the power-supply stop signal from a power detecting circuit has been received, the voice recognizing function is stopped and the power supply of the telephone line is received by the operation of a power supply transfer circuit, so that the fundamental telephone function is adapted to be operated. Accordingly, the power supply may be received from the separate power-supply circuit through an AC adapter or the like, the high/many functions in voice recognition or the like may be performed. When the separate power supply has stopped, the power supply of the telephone line is received to notify the operator that the high/many functions such as voice recognition, etc. cannot be performed. These functions stop, but the action of the basic telephone function may be continued.

Furthermore, in the other embodiment of the present invention, there is provided a voice recognizing telephone which is composed of a voice recognizing circuit, a first power supply for driving the voice recognizing circuit, a power detecting circuit for detecting the power of the first power supply, a second power supply for feeding the power into the voice recognition circuit at the power reduction of the first power supply, a power supply transfer circuit connected with the first and second power supplies, a line controlling circuit for controlling the connection and disconnection with the telephone line, and a controlling circuit connected with each circuit. Accordingly, the power of the first power supply for driving the voice recognizing circuit is monitored by the power detecting circuit, the first power supply and the second power supply are connected with the power supply transfer circuit. When the power of the first power supply is reduced, the controlling circuit may transfer the power supply which is fed into the voice recognizing circuit by the power supply transfer circuit.

BRIEF DESCRIPTION OF THE DRAWINGS

These and other objects and features of the present invention will become apparent from the following description taken in conjunction with the preferred embodiments thereof with reference to the accompanying drawings, in which.

DETAILED DESCRIPTION OF THE INVENTION

Before the description of the present invention proceeds, it is to be noted that like parts are designated by like reference numerals throughout the accompanying drawings.

Figure 1:
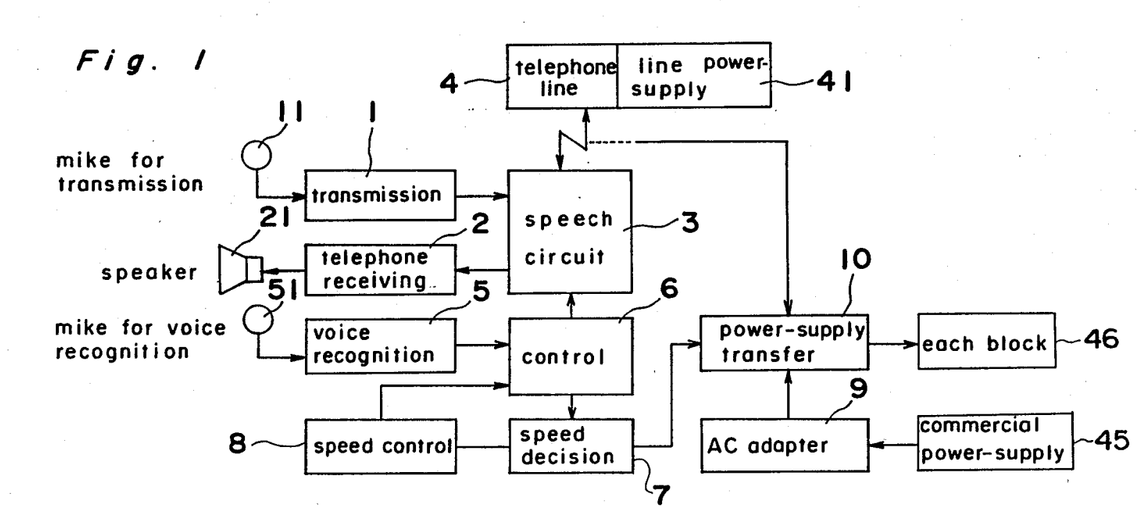
FIG. 1 is a block diagram showing a power supply transfer apparatus of a telephone in accordance with a first embodiment of the present invention.

Referring now to FIG. 1, there is shown according to a first embodiment of the present invention, a power supply transfer apparatus of a telephone, wherein a transmission circuit 1 for converting into electric signals voices inputted from a mike 11 for talk use, a speaker 21 for converting into the voices the voices of the talk partner obtained by the electric signals, and a telephone receiving circuit 2 for handling the electric signals are connected with a telephone line 4 through a speed circuit 3. It is to be noted that the current feed required for the connected telephone set to operate the basic telephone function is performed from the telephone line 4, in a shape superposed on the voices converted into the electric signals from a line power-supply 41, though the current feed is small in amount.

A voice recognizing circuit 5 recognizes the voice inputted from a mike 51 for voice recognizing use, and conveys its result to a controlling circuit 6. The controlling circuit 6 instructs the necessary operations for each block in accordance with the result. In the first embodiment shown of FIG. 1, the mikes 11, 51 are separately disposed for the talk use and for the voice recognizing use, but the voices may be taken in with the same one mike and the voices converted into the electric signals are branched on the way, so that they may be used in accordance with the forms suitable for the respective uses.

A speed deciding circuit 7 decides the operation speed necessary at this time, i.e., a high-speed operation or a low-speed operation by the surveillance of the control contents of the controlling circuit 6 to convey the results to a speed controlling circuit 8. The controlling operation of the operation speed to be performed by the speed controlling circuit 8 is considered to be performed by many methods, but it is one method to control the clock speed of the controlling circuit. The power-supply in this embodiment is performed by a line power supply 41 or an AC adapter 9 connected with a commercial power supply 45 as the other power supply circuit, and is performed by a power supply transfer circuit 10 to transfer said both power supplies through the reception of the instructions of the speed deciding circuit 7.

The actual operation of the power supply transfer apparatus of the first embodiment is as follows. The telephone normally operates as a telephone of a simple function. Accordingly, as the high-speed processing is not necessary, each block including the controlling circuit 6 is operated at a low speed by the speed controlling circuit 8 receiving a deciding result of the low-speed operation of the speed deciding circuit 7, with the result that the consumption current is small, the power may be fed even with the line power supply 41 only.

On the other hand, when the high-speed processing is required for voice recognitions, each block including the controlling circuit 6 requires the high-speed operation, and is operated in high speed by the speed controlling circuit 8 receiving the decision result of the high-speed operation of the speed deciding circuit 7. As a result, the consumption power increases so that the line power supply 41 is not sufficient enough to meet with the power being fed from the AC adapter 9 through the action of the power supply transfer circuit 10.

Figure 2:
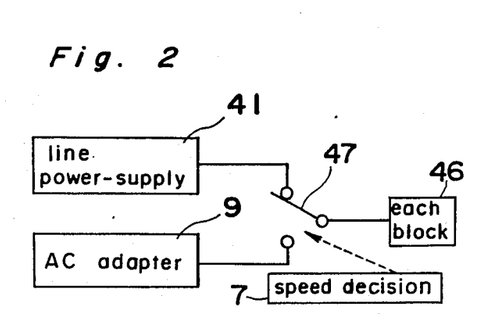
FIGS. 2 and 3 show a block diagram showing a power-supply transfer circuit of the apparatus of FIG. 1.
Figure 3:
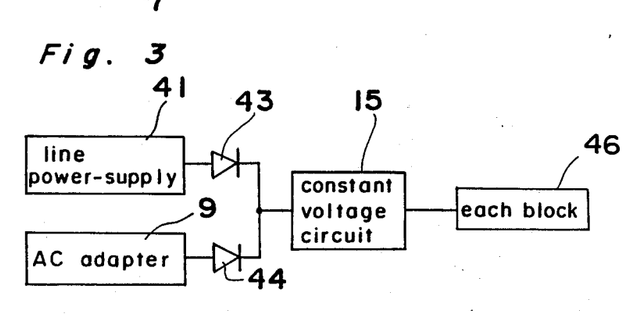

The power supply transfer is performed with a switch 47 through the reception of the result of the speed deciding circuit 7 as shown in FIG. 2. Also, as shown in FIG. 3, the outputs of the line power supply 41 and the AC adapter 9 may be realized in "or" (OR) shape through diodes 43, 44. In the power-supply transfer circuit of FIG. 3, the feed voltage V1 of the line power supply 41 is fed into a constant voltage circuit 15 through the diode 43 and is fed in power supply as a voltage V3 into ech block 46 from here. Though the feed voltage V2 of the AC adapter 9 is fed into a constant voltage circuit 15 through the diode 44 likewise, the automatic transfer of the feed power supply is performed by the difference in this voltage and the diode characteristics, because the voltage V2 is set a little lower than the feed voltage V1 of the line power supply 41. Namely, when the consumption is small in amount, the power is fed from the line power supply 41, while, when the consumption current has increased, the power is received from the AC adapter 9. The relationship between the respective voltages in the operation as the normal telephone function is as follows.

$$V1 > V2 > V3$$

In the example of FIG. 3, as the automatic transfer of the feed power supply is performed as apparent from the drawing, the result of the speed deciding circuit 7 is not required to be received.

Accordingly, in the first embodiment of the present invention, the operation in the actual time of the high-/many functions such as voice recognition and so on may be effected only when necessary. As the operation time is comparatively short, the entire telephone may be made considerably lower in consumption power.

Figure 4:
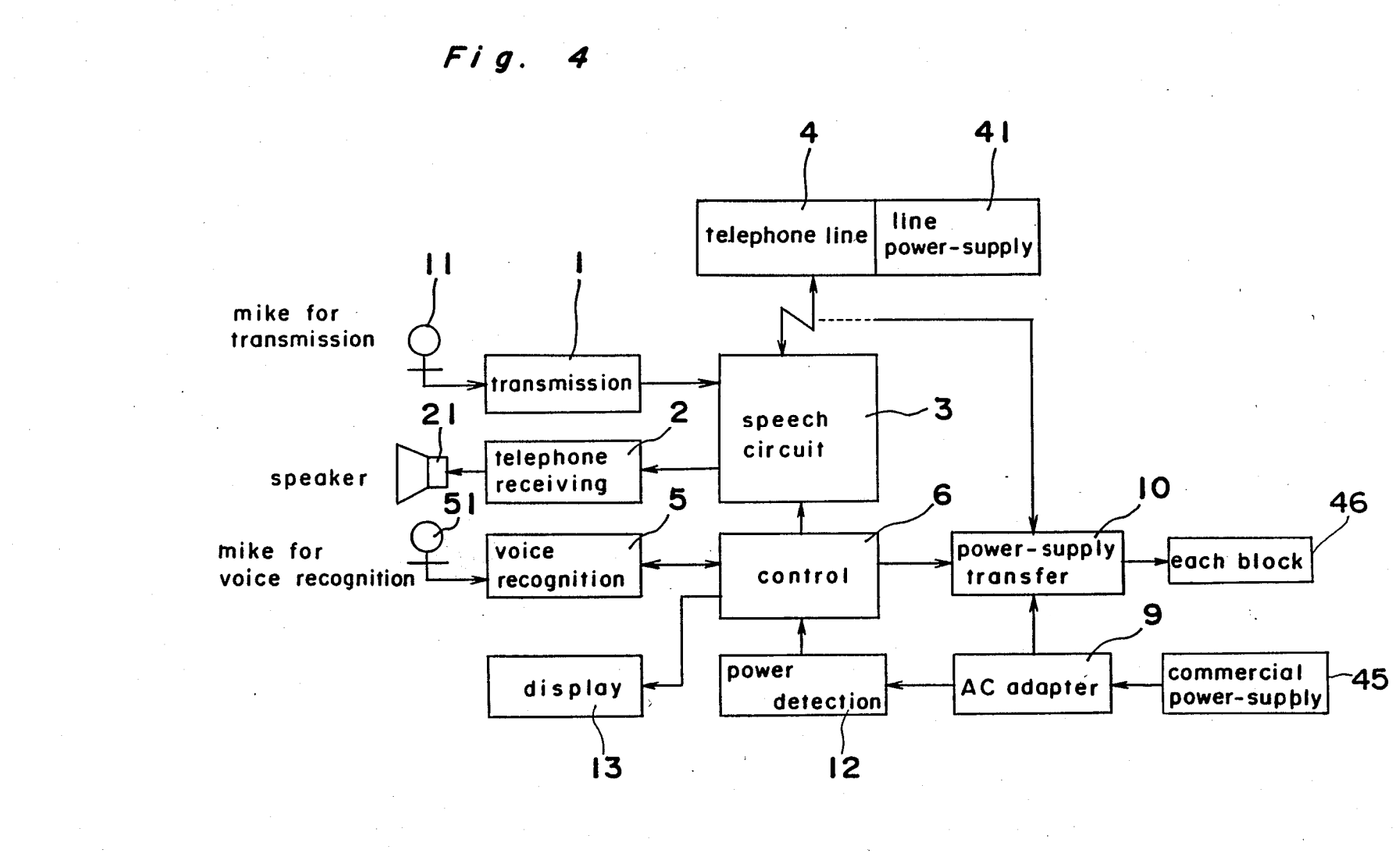
FIG. 4 is a block diagram showing a power supply transfer apparatus of a telephone in accordance with a second embodiment of the present invention.

The second embodiment of the present invention is shown in FIG. 4, wherein as to the same components as those of the first embodiment in FIG. 1, the same numerals are given to components of FIG. 4, with the description being omitted.

In the second embodiment of FIG. 4, the power feed into each block of the telephone can not be performed by the line power supply 41, because the consumption power increases due to providing high speed operation necessary for processing the high/many functions such as voice recognition and so on. The power is fed into each block through the power transfer circuit 10 by the power feed means from outside through the AC adapter 9.

Suppose the feeding operation of the commercial power which is the supply source of the AC adapter 9, and a power detecting circuit 12 detects the voltage drop of the AC adapter 9 to convey the detection signal to the controlling circuit 6. The controlling circuit 6 quickly completes the high/many function operations such as voice recognitions before the voltage drop continuously falls into an operation disabled condition in accordance with the detection signal to notify an operator by a display 13 that the high/many function operations such as voice recognitions can not be performed because of the power off. At this time, the controlling circuit 6 gives an instruction into the power supply transfer circuit 10 to transfer the power feed from the AC adapter 9 into the line power supply 41 immediately with the completion of the high/many function operations such as voice recognitions and so on together with this operation to transfer the power. The basic telephone function may be continuously used by these operations even when the other power supply such as commercial power supply 45 or the like has stopped.

Figure 5:
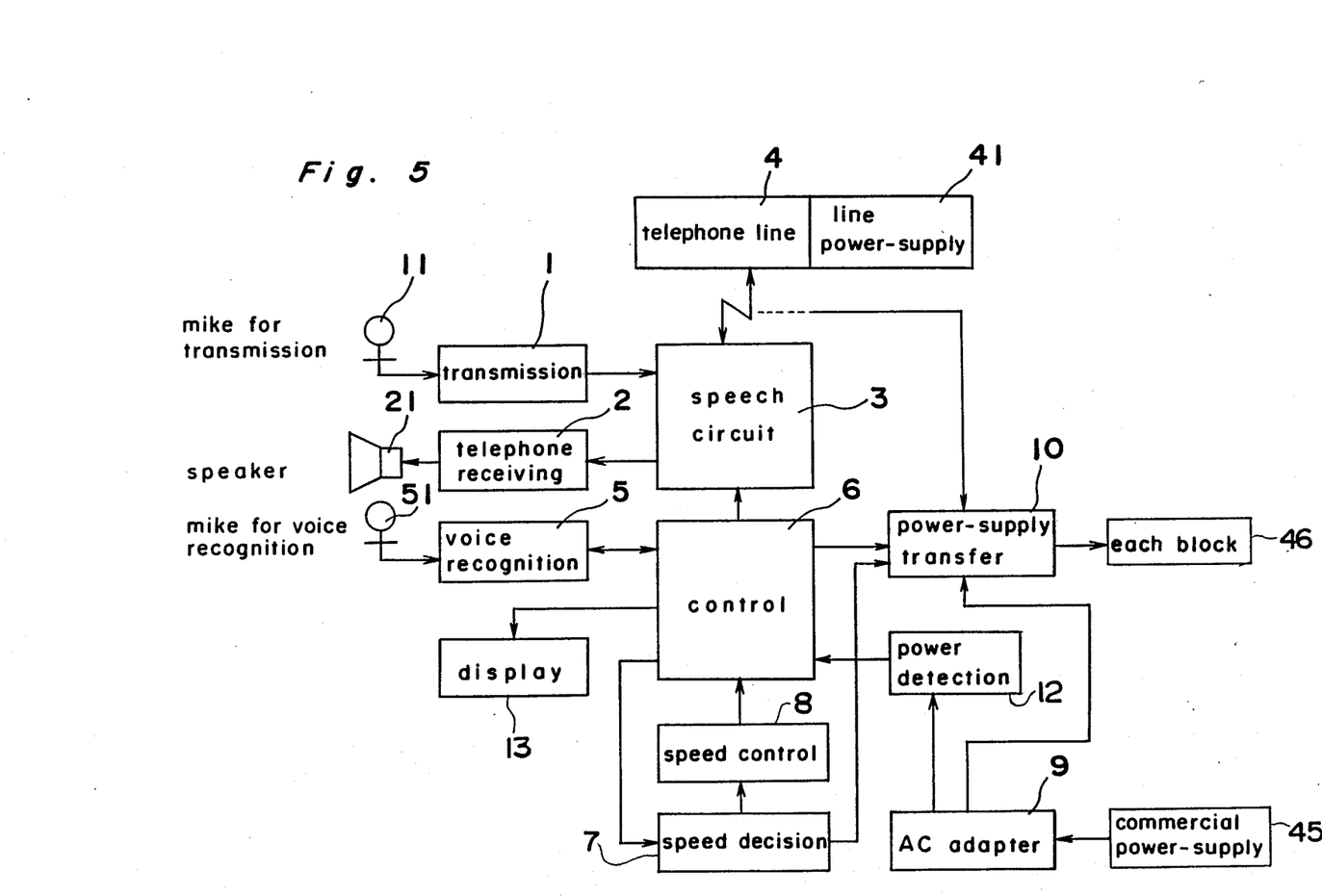
FIG. 5 is a block diagram showing a power supply transfer apparatus of a telephone in accordance with a third embodiment of the present invention.

A third embodiment shown in FIG. 5 is a further development of the embodiment of the second embodiment. The power supply transfer apparatus of the third embodiment is composed of a speed deciding circuit 7 and a speed controlling circuit 8 which are added to the second embodiment. The speed deciding circuit 7 decides the operation speed necessary by the usual surveillance of the control contents of the controlling circuit 6. In accordance with the deciding results, the speed controlling circuit 8 tells the necessary operation speed to each block including the controlling circuit 6. In addition, the power detection circuit 12 is provided between the controlling circuit 6 and AC adapter 9.

The actual operation of the third embodiment is as follows. The telephone normally operates as one of a simple function. Accordingly, as the high-speed processing is not required, each block including the controlling circuit 6 is operated at low speed by the speed controlling circuit 8 for receiving the deciding results of the low-speed operation of the speed deciding circuit 7. Thus, the consumption power is small in amount. The power may be fed by the line power supply 41 only.

On the other hand, when the high-speed processing for voice recognitions is required, each block including the controlling circuit 6 requires the high-speed operation. The high-speed operation is performed by the speed controlling operation 8, which has received the deciding result of the speed deciding circuit 7 that the operation is the low-speed one. As a result, the consumption current increases. The power is not sufficient enough to meet by the line power supply 41 only. The power feed is provided by the AC adapter 9. Needless to say, when the commercial power supply 45 has stopped, the power detecting portion 12 detects the voltage drop. The telephone may be used as one of a simple function by the power feed from the line power supply 41 through the processing described in the second embodiment.

Figure 6:
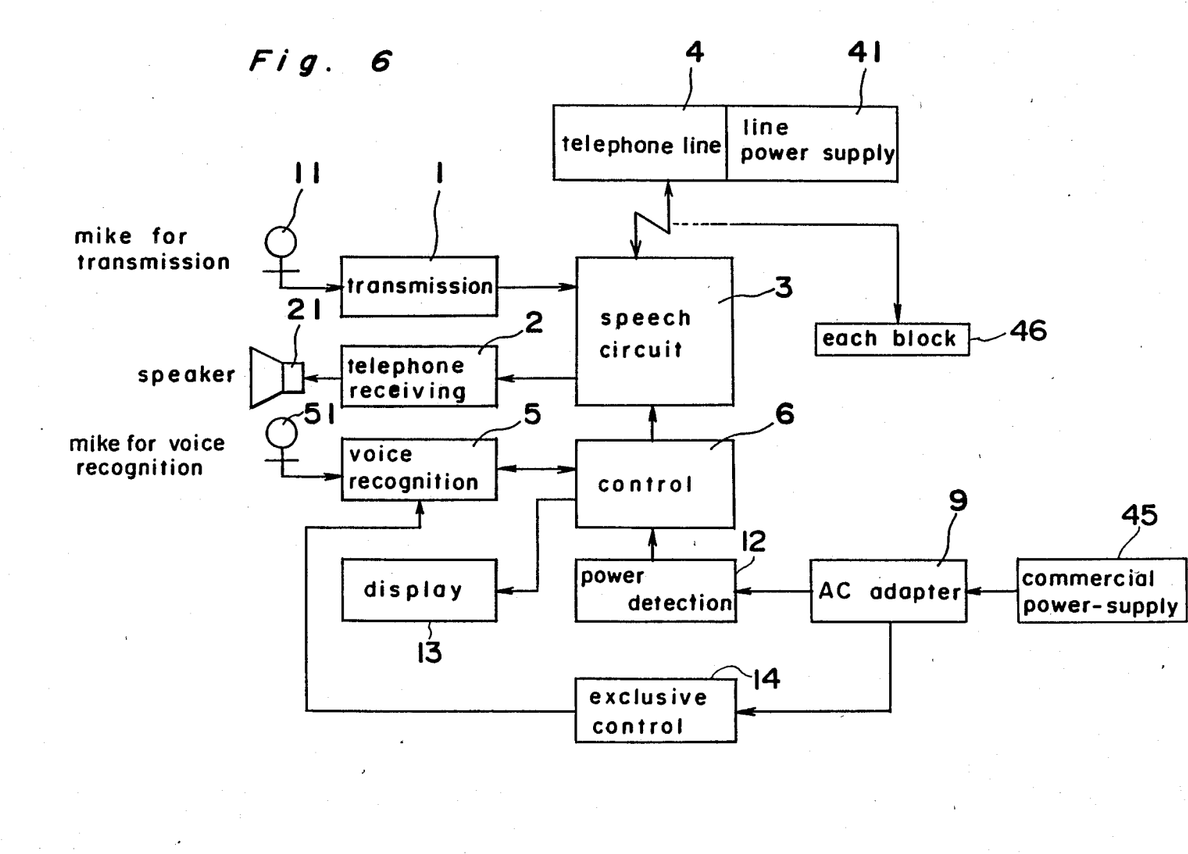
FIG. 6 is a block diagram showing a modification of the apparatus of FIG. 5.

Here the functions of the speed deciding circuit 7 and the speed controlling circuit 8 will be described hereinafter. The speed deciding circuit 7 decides the operation speed necessary at this time by the surveillance of the controlling contents of the controlling circuit 6. The operation-speed controlling through the speed controlling circuit 8 can be performed by many methods, and the clock speed of the controlling circuit 6 may be controlled as one method. The power feed in the third embodiment is performed by the line power supply 41 or by the adapter 9 connected with the commercial power supply 45 as the other power supply circuit, but the transfer of them is performed by the power supply transfer circuit 10 through the instructions of the speed deciding circuit 7. As shown in FIG. 6 as a modified embodiment of the second embodiment and third embodiment, it has an exclusive personal control circuit 14 of the high/many functions different from the controlling circuit 6, the voice recognizing circuit 5 is controlled by the personal controlling circuit 14, only the power of this circuit may be fed from the AC adapter 9, but the control soft becomes complicated in addition to the double hard construction of the circuit. The modified embodiment becomes fewer in merit as compared with the second embodiment and the third embodiment.

In the second and third embodiments of the present invention, the basic telephone function may be continuously operated, if the other power supply such as commercial power supply has stopped, with the high/many function operations for the voice recognitions being performed. In addition, the operations in the actual time of the high/many functions such as voice recognitions may be performed, so that the entire telephone may be made lower in consumption.

Figure 7:
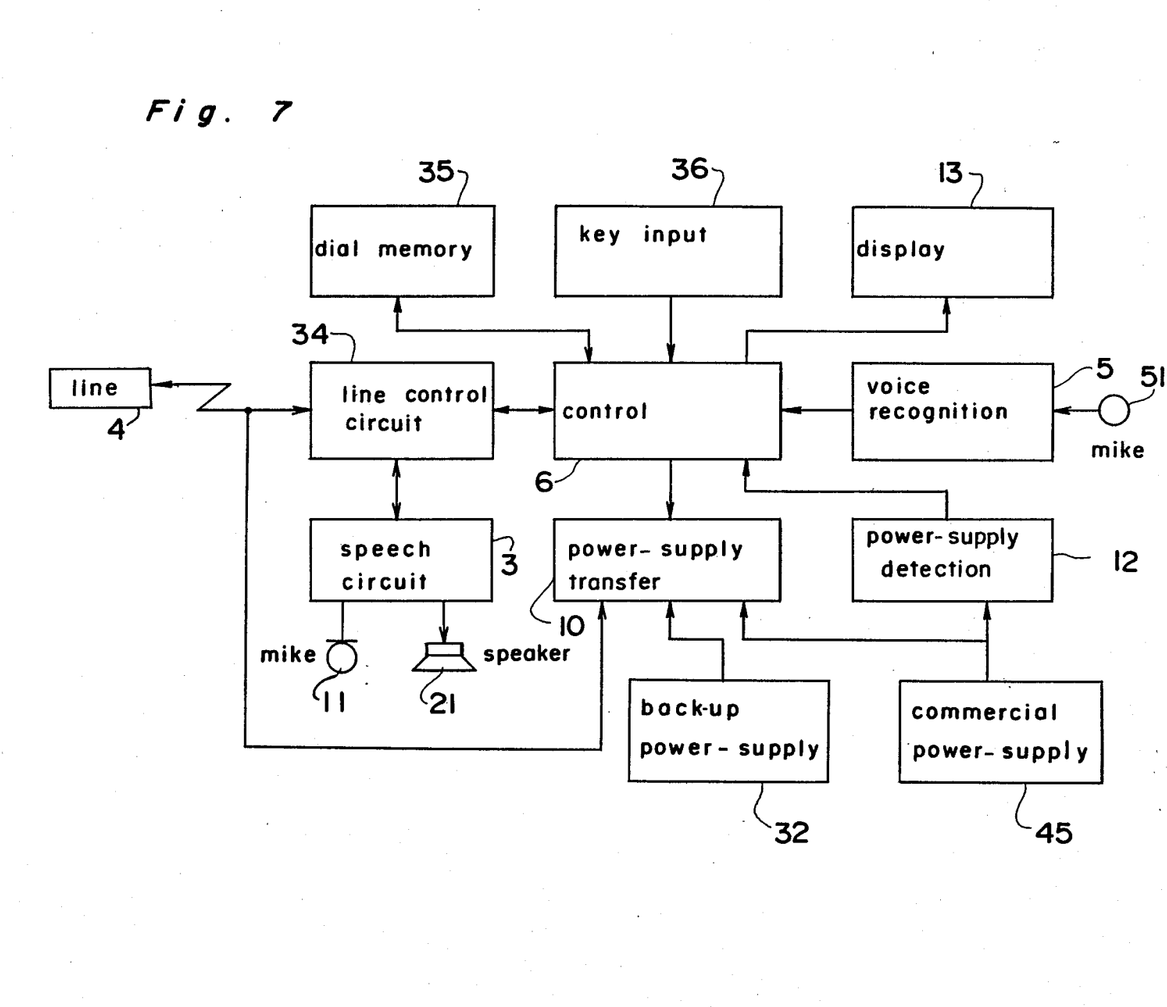
FIG. 7 is a block diagram showing a power supply transfer apparatus of a telephone in accordance with a fourth embodiment of the present invention.
Figure 8:
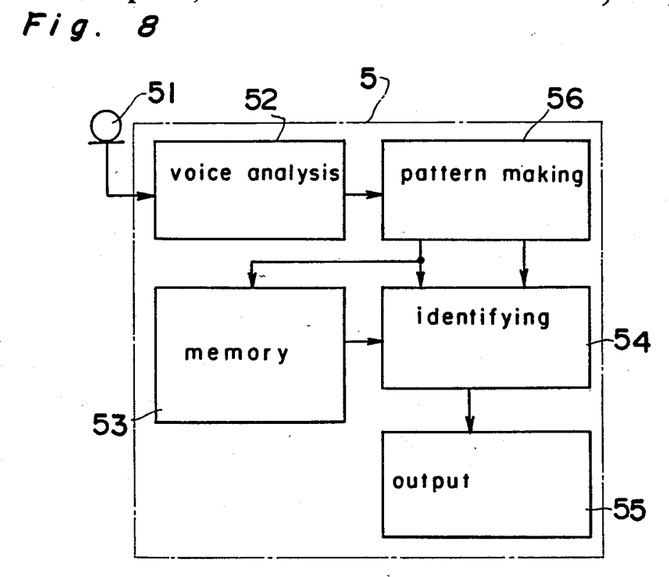
FIG. 8 is a block diagram showing a voice recognizing circuit of the apparatus of FIG. 7.
Figure 9:
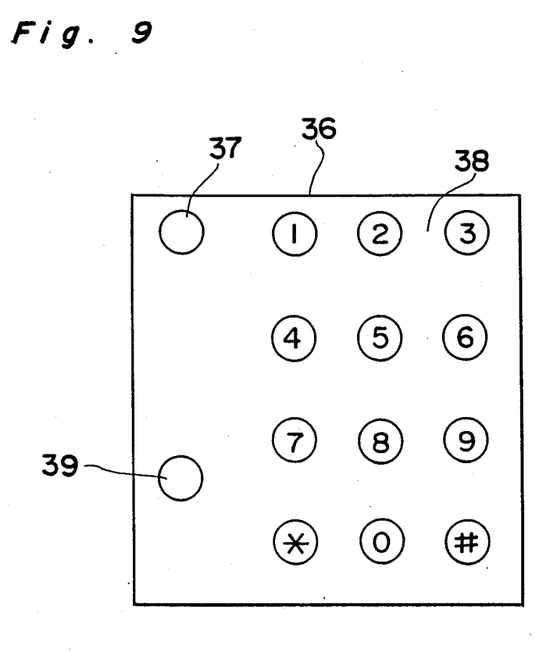
FIG. 9 is a view of a key input circuit of the apparatus of FIG. 7.

The fourth embodiment of the present invention will be described in accordance with FIG. 7 through FIG. 9. FIG. 7 is a block diagram of a voice recognizing telephone in the fourth embodiment of the present invention, wherein the mike 51 for voice recognizing use is connected with the voice recognizing circuit 5 composed of a voice analyzing circuit 52, a pattern making circuit 56 and an outputting circuit 55 as shown in FIG. 8.

The commercial power supply 45 of AC 100 V is connected with the controlling circuit 6 through the power detecting circuit 12 by way of an adapter (not shown). A back-up power supply 32 for batteries is connected with the power supply transfer circuit 10 together with the commercial power supply 45. The display circuit 13, a key input circuit 36 for ten keys, and a dial memory 35 for memorizing the telephone number of a partner are respectively connected with the controlling circuit 6. A line controlling circuit 34 controls the connection and disconnection of the telephone line 4, the speech circuit 3 are connected with the mike 51 and the speaker 21.

The registration for using the voice recognition telephone of the fourth embodiment will be described hereinafter. In order to register the voice and the telephone number, depress the registration switch 37 of the key input circuit 36 shown in FIG. 9 and a control command used to control the voice recognition telephone is displayed on the display circuit 13. The user performs the voice input of the control command from the mike 51 for voice recognition use in accordance with the display. When the voice is inputted, it is analyzed in the voice analyzing circuit 52 of the voice recognizing circuit 5 to form the pattern in a pattern making circuit 56, thereafter is stored in a memory 23.

When, for example, "off hook" has been displayed, the "off hook" is spoken towards the mike 51 for voice recognition use. Then, when the "on hook" has been displayed, speak the "on hook" towards the mike 51 for voice recognition use. Then, then the "OK" has been displayed, speak the "OK" toward the mike 51 for voice recognition use.

Next, input the voice of the numerals (1 through 0), finally input the telephone number of the partner with ten keys 38 or the voices. Furthermore, input the name of partner with voices from the mike 51 for voice recognition use to complete the registration. The telephone number of the partner which has been inputted at this time corresponds to the name of the partner and is stored in the dial memory 35. The registration of the voices is completed by the above operations, and becomes the mode of the voice recognition telephone to be actually used with the voices.

The voice recognition telephone mode will be described hereinafter. First, the user speaks "off hook" towards the mike 51 for voice recognition use. The inputted voices are analyzed at the voice analyzing circuit 52 of the voice recognizing circuit 5, the patterns are formed at the pattern making circuit 56, thereafter are compared with the contents of the memory 53 at the identifying circuit 54. When they are decided to be the "off hook", the decision is conveyed to the controlling circuit 6. The controlling circuit 6 instructs the line controlling circuit 34 to connect the telephone line 4, so that the line controlling circuit 34 connects the telephone line.

Then, the name of the partner is inputted in voice into the mike 51 for voice recognition use. When, for example, "sanyo" is inputted, the inputted voices are decided in the voice recognizing circuit 5. When the "OK" is recognized next, the controlling circuit 6 takes out from the dial memory 35 the telephone number corresponding to the name of the partner in accordance with these recognition results to convey it to the line controlling circuit 34. The line controlling circuit 34 outputs into the telephone line 4 the telephone number received from the controlling circuit 6. When the partner appears later, the talk starts by the speech circuit 3, mike 51, and speaker 21. A power supply to be fed from the line and the commercial power supply 45 (AC 100 V) are used as the power supply of the above described operation.

A case where the commercial power supply (AC 100 V) has gone wrong will be described hereinafter. When the commercial power supply 45 goes wrong, the failure is conveyed to the controlling circuit 6 from the power detecting circuit 12 which has a function of detecting the power of the commercial power supply 45, and the power supply transfer circuit 10 switches the power supply into the back up power supply 32 from the commercial power supply. Here, the back-up power supply 32 is a small sized battery which is capable of talking for about 1 through 2 minutes at the shortest.

The display circuit 13 displays that as the commercial power supply has gone wrong, thereafter the on hook and the redial may be selected within a constant time period. When the user inputs the "redial" with voices, the voice recognition circuit 5 recognizes the "redial" to convey it to the controlling circuit 6. The operation may be a switch operation by a redial instructions switch 39 located within the key input circuit 36. A telephone number to be redialed is stored in the redial region located within the dial memory 35 by these operations. After the predetermined time (for example, one minute), the telephone line 4 is automatically turned on.

When the commercial power supply 45 is recovered, the power detecting circuit 12 detects it. When the controlling circuit 6 performs the connection of the telephone line 4 through the line controlling circuit 34 to notify the user of a redialing operation through the display, buzzer or the like and performs the redial operation in accordance with the redial number located within the dial memory 35. Thus, the partner appears again to resume the talking. According to the fourth embodiment of the present invention, the on hook may be performed with voices even when the separate power supply from the line has gone wrong in the voice recognizing telephone. Also, if the talk is cut off halfway because of the power failure, the redialing may be automatically performed at the recovering time of the power supply.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A telephone apparatus comprising:
a transmitting circuit for converting input voices into electric signals,
a telephone receiving circuit for outputting voices in response to electric signals,
a speech circuit for connecting the transmitting circuit and the telephone receiving circuit with a telephone line having power therein, controlling means connected to said circuits for controlling said transmitting and receiving circuits, a speed deciding means for deciding an operational speed of the controlling means to be one of low-speed operation and high-speed operation,
a power-supply transferring circuit for transferring between a separate power-supply circuit that is separate from the telephone line and a line power-supply on the telephone line so that power is supplied from the telephone line by the power-supply transferring circuit when the operational speed has been decided as being for low-speed operation by the speed deciding means and so that the power is supplied from the separate power supply circuit by the power-supply transferring circuit when the operational speed of the controlling means has been decided as being for high-speed operation.

2. A telephone apparatus comprising:
telephone communication means for effecting telephone communication, said telephone communication means including a transmitting circuit for converting input voices into electric signals, a telephone receiving circuit for outputting voices, and a speech circuit for connecting the transmitting circuit and the telephone receiving circuit with a telephone line,
a voice recognizing circuit for extracting and identifying characteristics of the input voices,
a power detecting circuit for detecting a stoppage of power from a separate power-supply circuit and for generating a power-supply stop signal,
a displaying circuit for displaying a notification of a power-off condition of the power-supply circuit in response to the generation of said power-supply stop signal by said power detecting circuit; and a power-supply transferring circuit for switching between a line power-supply on the telephone line and the separate power-supply circuit, said power-supply transferring circuit being responsive to the generation of the power-supply stop signal by said power detecting circuit to switch the line power-supply so as to power said telephone communication means.

3. A telephone apparatus comprising:

telephone communication means for effecting telephone communication;

a voice recognizing circuit, a power detecting circuit for detecting power supplied from a first power supply to said voice recognizing circuit, a second power supply for feeding the power into the voice recognizing circuit upon reduction of the power from the first power supply, a controlling transferring circuit for transferring between the first and second power supplies, a line controlling circuit for effecting one of a connection and a disconnection between the telephone communication means and a telephone line, said detecting means being responsive to a power level supplied by the first power supply dropping beneath a predetermined level during the operation of the voice recognizing circuit for transmitting a detection signal, the power transferring circuit being responsive to the transmission of the detection signal to switch from the first power supply to the second power supply, and said line controlling circuit being responsive to the transmission of the detection signal for cutting off the telephone communication means after a predetermined time.

4. A telephone apparatus comprising:

telephone communication means including transmitting means for converting a voice input into signals;

voice recognition means for extracting and identifying characteristics of the signals; and power supply transferring means for switching between a first power source and a second power source, said power supply transferring means switching from the second power source to the first power source in response to an operation of said voice recognition means so as to supply power to said voice recognition means, said power supply transferring means switching from said first power source to said second power source so as to supply power to said telephone communication means in response to any one of a cessation of said operation of said voice recognition means, a stoppage of power supplied by said first power source, and a power level supplied by said first power source falling below a predetermined level.

5. The telephone apparatus as claimed in claim 4, wherein said first power source is an alternating current source, and said second power source is a line power source.

6. The telephone apparatus as claimed in claim 4, wherein said first power source is an alternating current source and the second power source is a battery.

7. The telephone apparatus as claimed in claim 6, wherein said controlling circuit is connected to a power detecting circuit for detecting a power level from the alternating current source and to a line controlling circuit for controlling a connection and disconnection between a telephone line and the telephone communication means so that when a level of the power supplied by the alternating current source drops during the operation of the voice recognizing circuit, a detection signal of the power detecting circuit is transmitted into the controlling circuit from the power detecting circuit, the controlling circuit switches from the alternating current source to said battery by the power supply transferring circuit, and the line controlling circuit cuts off the telephone communication means from the telephone communication means from the telephone line after a predetermined time.

8. The telephone according to claim 4, wherein said telephone communication means further includes telephone receiving means for outputting voices, speech means for connecting said transmitting means and said telephone receiving means with a telephone line, and control means for connecting said speech means with said voice recognition means.

9. The telephone according to claim 4, further comprising:

control means having an operational speed; and speed deciding means for deciding the operational speed of said control means to be one of a low-speed operation and high-speed operation, said power transferring means supplying power from said first power means to provide said low-speed operation of said control means in response to said speed deciding means deciding said low-speed operation, said power transferring means supplying power from said second power means to provide said high-speed operation of said control means in response to said speed deciding means deciding said high-speed operation.

10. The telephone according to claim 4, further comprising:

means for detecting a stoppage of power from said first power source and for generating a stop signal in response thereto, said voice recognition means stopping in response to the stop signal generated by said detecting means, said telephone communication means performing a fundamental operation in telephone communication when power is supplied from said first power source.

11. The telephone according to claim 4, wherein said predetermined level is less than a level sufficient for enabling said voice recognition means to function correctly.

* * * * *